June 16, 1942.  J. P. CHAMBERLAIN  2,286,598
WEIGHING APPARATUS
Filed March 9, 1939
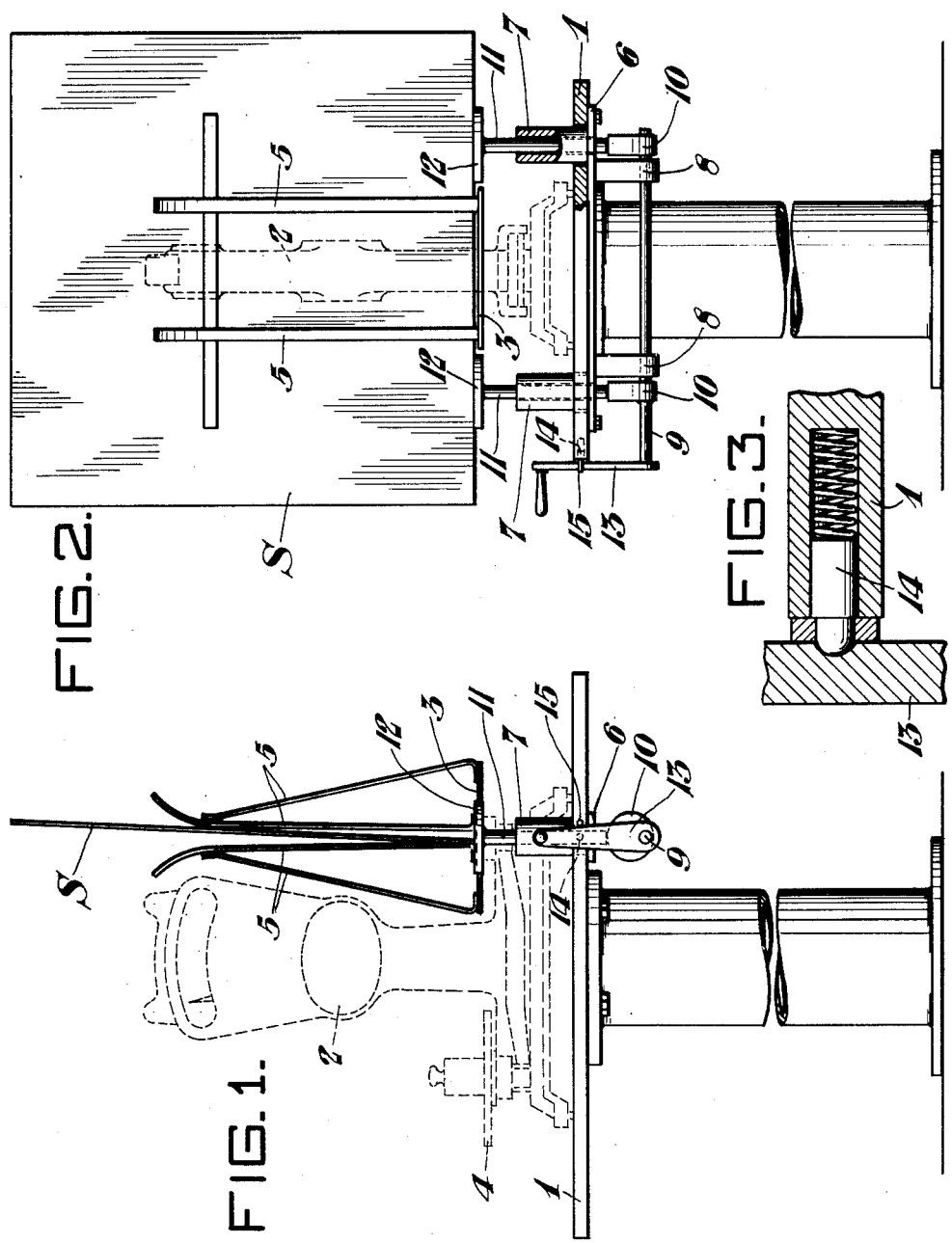
Inventor:
JULIUS P. CHAMBERLAIN,
by: John E. Jackson
his Attorney.

Patented June 16, 1942

2,286,598

UNITED STATES PATENT OFFICE 2,286,598

WEIGHING APPARATUS

Julius P. Chamberlain, Warner, Ohio

Application March 9, 1939, Serial No. 260,825

1 Claim. (Cl. 265—27)

This invention relates to weighing apparatus and is particularly concerned with such apparatus when used industrially under circumstances requiring accurate weighing.

A specific example of the invention is illustrated by the accompanying drawing in which:

Figure 1 is a front view of the apparatus;

Figure 2 is a side view; and,

Figure 3 is a sectional enlargement of a detail.

More specifically, this drawing shows a table top 1 on which a scale 2 is mounted, this scale having a weighing platform 3 and weight plate 4. The platform 3 has spaced upstanding arms 5 between which sheets of tin plate may be placed on edge with their edges overhanging the platform, the drawing showing a sheet S so placed.

It is necessary to weigh the sheet of tin plate very accurately because this is done to determine the weight of tin it carries. It follows that the scale 2 must have a relatively delicate weighing mechanism which is easily damaged by rough treatment of the weighing platform. Industrial usage is such that the weighing platform is usually treated rather roughly.

Continuing, a plate 6 is screwed transversely to the bottom of the table top 1 beneath the weighing platform 3, upstanding bushings 7, which pass through holes in the table top 1, being welded to this plate, the arrangement being such that these bushings 7 are spaced to either side of the weighing platform 3. Depending brackets 8 are also welded to this plate 6, these brackets journaling a shaft 9 transversely beneath the openings in the bores of the bushings 7, this shaft mounting cams 10 directly beneath these bores. Rods 11 slide vertically in the bushings 7, the lower ends of these rods riding on the cams 10 and their upper ends carrying supports 12 for the overhanging edges of the sheet of tin plate S.

The shaft 9 is provided with a handcrank 13, the throw of this crank, the contours of the cams 10 and the lengths of the rods 11 all being correlated so that when this crank is vertical the supports 12 prevent the sheet from touching the weighing platform 3, and when this crank 13 is thrown downwardly the sheet is lowered on the weighing platform. Furthermore, the various parts just mentioned should be so correlated that the sheet cannot strike or lift from the weighing platform with damaging force regardless of the rapidity with which the crank 13 is thrown.

During loading and unloading of the sheet, the crank 13 is held upwardly by a latch 14, this being of the type which can be disengaged by forceful movement of the crank. A pin 15 serves as a convenient stop for positioning the lever in its proper vertical position.

It is apparent from the foregoing that very rugged apparatus carries the stresses of placing and removing the sheet of tin plate. The actual application and removal of the weight of the sheet to the weighing platform 3 must, of necessity, be done gently. This follows from the fact that regardless of how rapidly the crank is thrown, the supports 12 engaging the overhanging sheet edge, move relatively slowly.

I claim:

Metal sheet weighing apparatus comprising a weighing platform having spaced upstanding arms between which the sheets may be placed on edge with their edges overhanging said platform, vertically movable supports on either side of said platform for engaging sheet edges overhanging said platform, vertically movable vertical rods with their upper ends carrying said supports, rotary cams on which the lower ends of said rods rest and a handcrank for turning said cams, the latter being contoured and the length of said handcrank being such that manual movement of said handcrank with rapidity cannot result in a sheet striking said platform with damaging force.

JULIUS P. CHAMBERLAIN.